United States Patent
Stefani et al.

(10) Patent No.: US 10,125,511 B2
(45) Date of Patent: Nov. 13, 2018

(54) ANTI-SEISMIC SUPPORT FOR WAREHOUSES AND LOAD-BEARING STRUCTURE WITH SUCH SUPPORT

(71) Applicant: MODULA S.P.A. CON SOCIO UNICO, Fiorano Modenese (Modena) (IT)

(72) Inventors: Franco Stefani, Sassuolo (IT); Stefano Cassani, Imola (IT)

(73) Assignee: MODULA S.P.A. CON SOCIO UNICO, Fiorano Modenese (IT)

( * ) Notice: Subject to any disclaimer, the term of this patent is extended or adjusted under 35 U.S.C. 154(b) by 0 days.

(21) Appl. No.: 15/518,261

(22) PCT Filed: Nov. 17, 2015

(86) PCT No.: PCT/IB2015/058863
§ 371 (c)(1),
(2) Date: Apr. 11, 2017

(87) PCT Pub. No.: WO2016/103073
PCT Pub. Date: Jun. 30, 2016

(65) Prior Publication Data
US 2017/0284119 A1   Oct. 5, 2017

(30) Foreign Application Priority Data

Dec. 23, 2014   (IT) .......................... 102014902318980

(51) Int. Cl.
*E04B 1/98* (2006.01)
*E04H 9/02* (2006.01)
*B65G 1/02* (2006.01)

(52) U.S. Cl.
CPC ............... *E04H 9/023* (2013.01); *B65G 1/02* (2013.01); *E04H 9/021* (2013.01); *B65G 2207/20* (2013.01)

(58) Field of Classification Search
CPC ......... E04H 9/023; E04H 9/021; E04H 9/028; E04B 1/98; E04B 1/985
See application file for complete search history.

(56) References Cited

U.S. PATENT DOCUMENTS 3,638,377 A * 2/1972 Caspe ..................... E04H 9/021
                                                    52/167.4
3,794,277 A * 2/1974 Smedley ................. F16F 7/127
                                                    174/161 R
(Continued)

FOREIGN PATENT DOCUMENTS

JP         H0478343 A      3/1992
JP         2002068430 A    3/2002
(Continued)

*Primary Examiner* — Brian D Mattei
(74) *Attorney, Agent, or Firm* — Pearne & Gordon LLP

(57) ABSTRACT

An anti-seismic device (1) for load-bearing structures or machines for example automated warehouses, comprises at least one supporting foot (3) suitable for being fixed to a load-bearing structure of the automated warehouse. The supporting foot (3) is configured for resting and sliding on a support and sliding surface (5), so as to allow relative movement of the automated warehouse with respect to the support and sliding surface (5). At least one abutment element (10) is suitable for being solidly constrained with the support and sliding surface (5). At least a spring device (12) is suitable for being interposed between the abutment element (10) and the automated warehouse. The spring device (12) is configured to generate a return action (force and/or torque) of the automated warehouse as a result of the relative movement of the automated warehouse with respect to the support and sliding surface (5). The spring device (12) has a non-linear, preferably progressive elastic characteristic.

25 Claims, 19 Drawing Sheets

(56) References Cited

U.S. PATENT DOCUMENTS

| | | | | |
|---|---|---|---|---|
| 3,906,689 A | * | 9/1975 | Nakayama | E04H 9/021 267/136 |
| 4,554,767 A | * | 11/1985 | Ikonomou | E02D 27/34 52/167.9 |
| 4,599,834 A | * | 7/1986 | Fujimoto | E02D 27/34 376/285 |
| 5,014,474 A | * | 5/1991 | Fyfe | E02D 31/08 14/73.5 |
| 7,249,442 B2 | | 7/2007 | Pellegrino et al. | |
| 9,732,517 B1 | * | 8/2017 | Huang | E04B 1/985 |
| 2006/0237378 A1 | * | 10/2006 | Pellegrino | A47F 5/0018 211/29 |
| 2017/0145686 A1 | * | 5/2017 | Lee | E04B 1/98 |

FOREIGN PATENT DOCUMENTS

| | | | |
|---|---|---|---|
| JP | 2002181355 A | | 6/2002 |
| JP | 2006125140 A | | 5/2006 |
| WO | 2006110702 A2 | | 10/2006 |

\* cited by examiner

ANTI-SEISMIC SUPPORT FOR WAREHOUSES AND LOAD-BEARING STRUCTURE WITH SUCH SUPPORT

The invention relates to an anti-seismic device for load-bearing structures or machines, particularly for automated warehouses, and a load-bearing structure or machine, in particular a warehouse.

There are known anti-seismic devices used in the building industry to secure housing and/or industrial buildings. The design and sizing of such anti-seismic devices depend on the specific construction as well as on the seismic vulnerability of the zone. As a result, in the construction sector anti-seismic devices are designed and sized ad hoc.

This customized approach makes known anti-seismic devices unsuitable for sectors other than the building sector. Additionally, these anti-seismic devices of the known type are not suitable for being applied in the sector of load-bearing structures or machines apt for supporting time-varying loads. Particularly in the case of automated warehouses, the known anti-seismic devices are not applicable, both for economic reasons due to the high costs arising from the need to have a specific design for each automated warehouse, and for technical reasons since the mass of an automated warehouse exhibits a considerable percentage change between the empty condition and the full condition of the warehouse.

It therefore remains substantially still unsatisfied the need to have available anti-seismic devices adapted to be applied to load-bearing structures or machines, particularly to automated drawer-type warehouses. In particular, it remains unsatisfied the need to have available inexpensive anti-seismic devices which allow to not excessively affect the cost related to the automated drawer-type warehouse, as well as to maintain limited and substantially constant the maximum accelerations to which the automated drawer-type warehouse is subject under any load condition, thereby preventing any overturning and/or movements that would result in accidental falls of the drawers, for example in the case where automated warehouses are provided with drawers, and to contain as much as possible the stress level within the supporting structural elements.

In this context, the technical task at the base of the present invention is to provide an anti-seismic device which overcomes the drawbacks of the known art mentioned above and which is able to meet aforementioned requirement.

In particular, it is an object of the present invention to provide a device for anti-seismic structures or machines, in particular warehouses, that is able to allow movement of the load-bearing structure or the machine relative to the ground and to cause the movement to return in the initial position, preferably by dissipating the kinetic energy transmitted by the earthquake to the load-bearing structure or to the machine.

A further object of the present invention is to provide a "universal" anti-seismic device, i.e. a device which can be adapted to any load-bearing structure and which is able to limit the maximum accelerations to which the load-bearing structure is subject, owing to a behavior which is independent of the load condition of the load-bearing structure. Such independent behavior allows to maintain a constant level of the maximum acceleration in the oscillating movement induced by the earthquake upon variation of the total mass, which mass is to be understood as the sum of the fixed mass of the load-bearing structure and the variable load mass.

The technical task mentioned and the aims specified are substantially attained by an anti-seismic device for load-bearing structures or machines and by a load-bearing structure or machine, comprising the technical characteristics disclosed in one or more of the appended claims. The dependent claims correspond to different embodiments of the invention.

Further characteristics and advantages of the present invention will become more apparent from the indicative, and therefore non-limiting, description of a preferred but non-exclusive embodiment of a anti-seismic device, as illustrated in the accompanying drawings in which.

Figure 1:
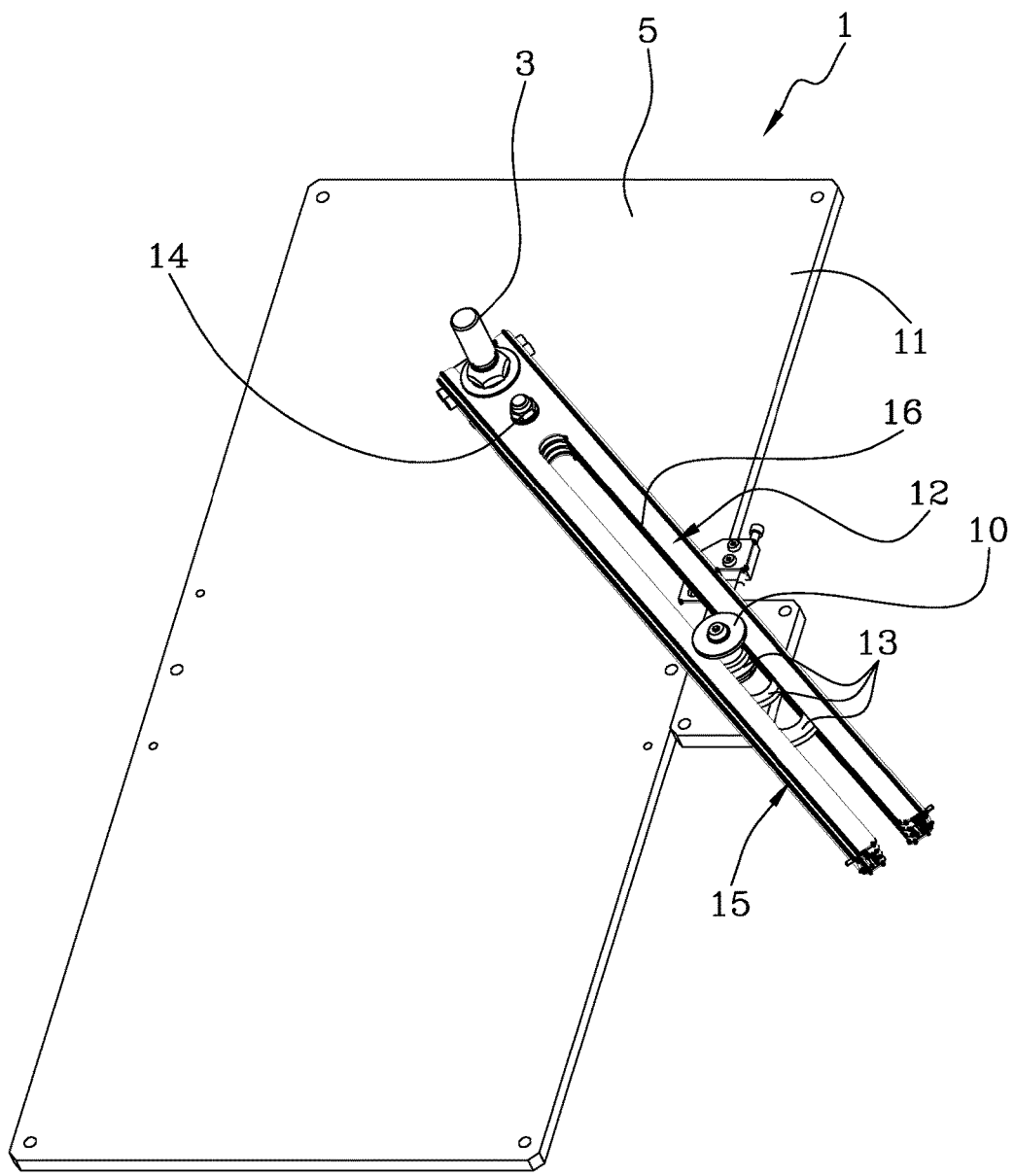
FIG. 1 is a perspective schematic view of an anti-seismic device according to one possible embodiment of the present invention.

With reference to the attached figures, in particular to FIGS. 1-4, by 1 it is indicated an anti-seismic device for load-bearing structures or machines in its entirety, in particular for automated warehouses 2. Hereinafter, explicit reference will be made to the application in an automated drawer-type warehouse 2 although it is possible any application to any load-bearing structure or machine.

The anti-seismic device 1 comprises at least a supporting foot 3 which is suitable for being fixed to a load-bearing structure 4 of the automated warehouse 2.

The supporting foot 3 is configured to rest and slide on a support and sliding surface 5 so as to allow the relative movement of the automated warehouse 2 with respect to the support and sliding surface 5. The support and sliding surface 5 is particularly a horizontal surface, integral with the ground, and the supporting foot 3 is configured for resting and sliding horizontally thereon.

Furthermore, the supporting foot 3 can define an energy dissipation element and for this purpose may comprise a sliding shoe 6 which is made of a material suitable to withstand high temperatures which may be caused by friction during sliding of the supporting foot 3 on the support and sliding surface 5. For example, the sliding shoe 6 can be made of ultra-high molecular weight UHMWPE polyethylene or metal coated with fluoropolymer and binder resins reinforcement based films.

Figure 18:
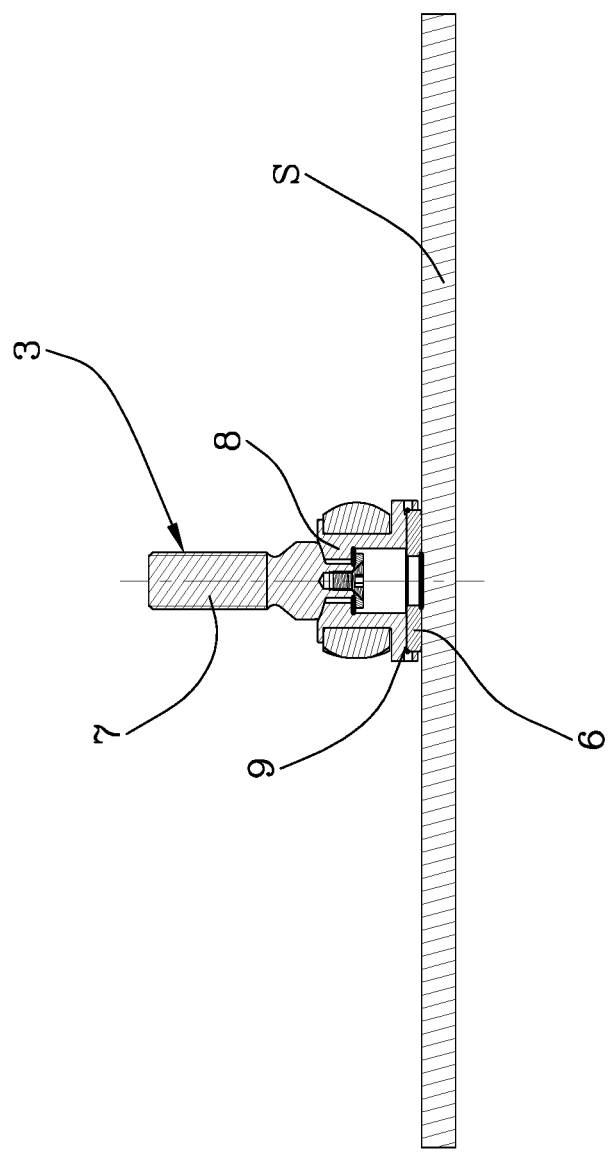
FIG. 18 is a schematic sectional view of the detail B of FIG. 2.

With reference to FIG. 18, the supporting foot 3 may comprise a stem 7 suitable for being fixed to the load-bearing structure 4 of the automated warehouse 2. In particular, the stem 7 is suitable to be arranged vertically. The stem 7 is connected to a base 8 defining a receiving seat 9 of the sliding shoe 6.

The lower surface of the supporting foot 3 and in particular the sliding shoe 6 is resting on the support and sliding surface 5, so that the supporting foot 3, and thus the automated warehouse 2, can slide horizontally with respect to the ground, whereon the automated warehouse is resting. In this way the supporting foot 3 performs the function of decoupling the horizontal movement of the automated warehouse 2 with respect to the movement of the ground. Furthermore, the supporting foot 3 performs the function of energy dissipation element due to friction that is generated by the relative sliding between the sliding shoe 6 and the support and sliding surface 5.

Figure 20:
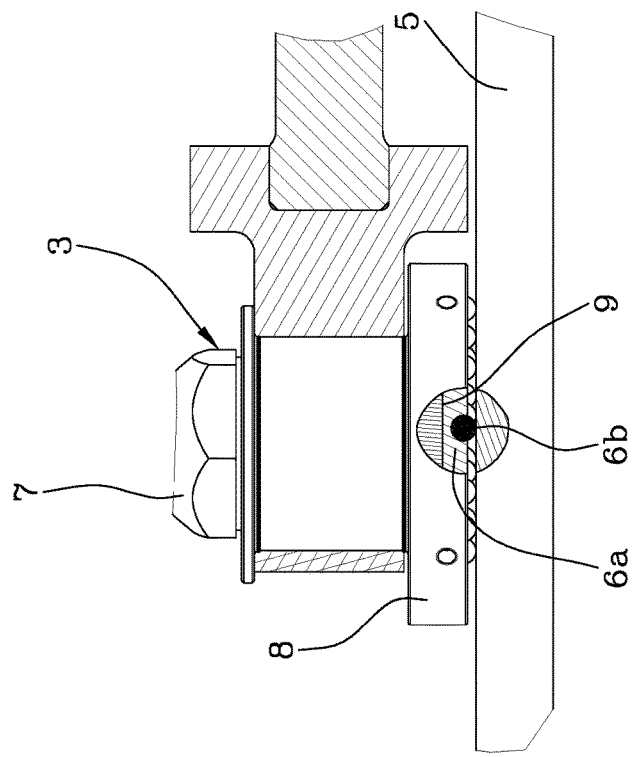
FIG. 20 is a schematic sectional view of the detail of FIG. 19.
Figure 19:
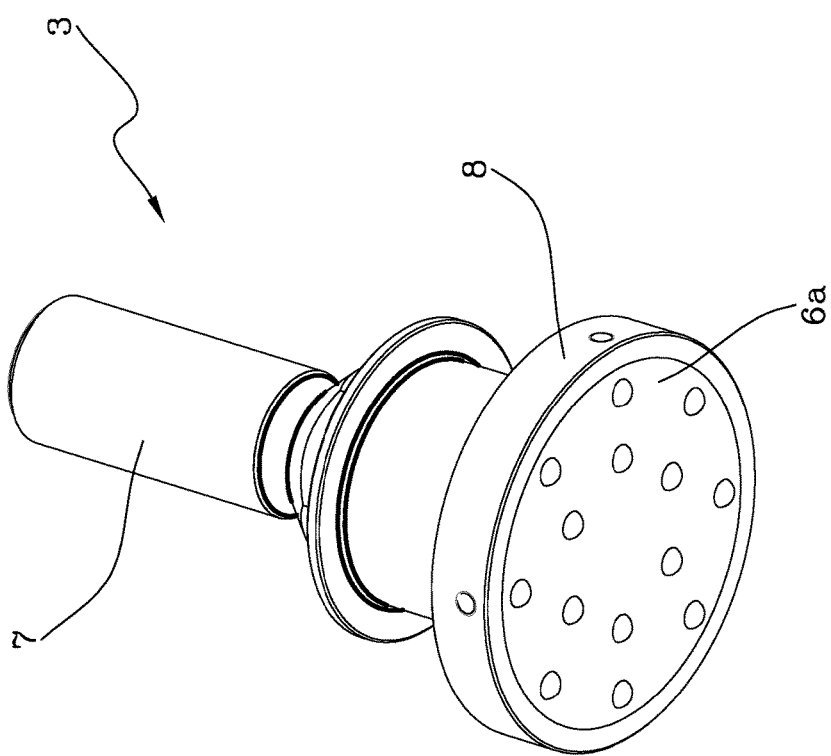
FIG. 19 is a schematic perspective view of the detail A of FIG. 13.

In accordance with a possible alternative, illustrated by way of example in FIG. 19 or 20, the supporting foot 3 comprises a stem 7 which is suitable for being fixed to the load-bearing structure 4 of the automated warehouse 2. In particular, the stem 7 is suitable to be arranged vertically.

The stem 7 is connected to a base 8 defining a receiving seat 9 of a rolling shoe 6a. In other words the rolling shoe 6a comprises a plurality of rolling elements 6b, for example spheres.

The lower surface of the supporting foot 3 and in particular the rolling shoe 6a is resting on the support and sliding surface 5 so that the supporting foot 3, and thus the automated warehouse 2, can slide horizontally with respect to the ground whereon the automated warehouse is resting.

Also in this case the supporting foot 3 performs the function of decoupling the horizontal movement of the automated warehouse 2 with respect to the movement of the ground. Unlike the supporting foot 3 provided with a sliding shoe, 6 the solution of the supporting foot 3 provided with rolling shoe 6b, allows to limit the energy dissipation which is generated by the sliding of the supporting foot 3 on the support and sliding surface 5.

The anti-seismic device 1 further comprises at least an abutment element 10 which is adapted to be made solidly constrained with the support and sliding surface 5.

Preferably, the anti-seismic device 1 comprises a sliding plate 11 suitable to be made solidly constrained with a surface of the ground supporting the warehouse 2. The sliding plate 11 defines the support and sliding surface 5 for the supporting foot 3. In this case the abutment element 10 may be solidly constrained with the sliding plate 11 and is preferably defined by a pin which protrudes transversely from the support and sliding surface 5.

The anti-seismic device further comprises at least one spring device 12 adapted to be interposed between the abutment element 10 and the automated warehouse 2.

The spring device 12 is configured to generate a return action (force and/or torque) of the automated warehouse 2 as a result of the relative movement of the automated warehouse with respect to the support and sliding surface 5.

The spring device 12 is preferably configured to generate a return force of the automated warehouse 2 as a result of the relative movement of the automated warehouse with respect to the support and sliding surface 5.

The spring device can operate along a direction, in one direction or in opposite directions.

In other words, the spring device 12 can be so arranged as to generate a return force that can be oriented in both directions or in one direction only: in the first case the spring device 12 develops its action when, due to the effect of the movement of the automated warehouse 2 with respect to the ground, a change in the length thereof occurs and this return action is such as to tend to restore the resting length of the spring device 12 both in the case of an elongation or a shortening of the device. In the second case, if the spring device 12 is of the "traction" type, the action develops only if there is an increase in length of the device compared to the resting length, whilst if the spring device is of the "compression" type, the action arises when the length of the device is lower than the resting length.

Advantageously, the spring device has a non-linear, preferably progressive spring characteristic. The term "spring characteristic" of the spring device 12 indicates the curve expressing the relation between the action (force and/or torque), applied to the spring device, and its geometric variation associated to the (linear and/or angular) displacement of the automated warehouse 2 from the corresponding resting position with respect to the support and sliding surface 5.

The spring device 12, which is preferably so designed as to generate a return force, exhibits a progressive spring characteristic when its stiffness increases as the supporting foot 3 becomes relatively increasingly spaced apart from the abutment element 10, starting from the initial relative "resting" position, (i.e. upon increasing of the length variation of the spring device 12 with respect to the resting length). Since in the presence of horizontal movement of the ground, for a certain spring device 12, greater displacements occur upon growing of the mass associated with the automated warehouse 2, (which mass is to be understood as the sum between the mass of the load-bearing structure 4 and the masses of the products stored), the effect obtained is that the spring device 12 tends to work within a greater stiffness range upon increasing of the mass associated with the automated warehouse 2. The result obtained is that the spring device 12, and in particular its elastic characteristic, can be configured in such a way that, during the oscillating movement induced by the earthquake, the spring device 12 exhibits a maximum acceleration that is independent of the value of the mass associated with the automated warehouse 2.

The spring device 12 can be designed in such a manner that the elastic elements are pre-loaded, i.e. a force greater than a pre-determined value is required which gives rise to a variation in length of the spring device 12. The higher is the pre-load value conferred on the elastic elements, the more the spring device 12, at the end of the earthquake, tends to bring back the automated warehouse 2 in the position in which the automated warehouse 2 was before the earthquake.

In particular, the spring device 12 can be operationally interposed between the supporting foot 3 and the abutment element 10.

In accordance with a possible embodiment, shown by way of example in FIGS. 1-5, the spring device 12 comprises at least two elastic rings 13 made of elastomer, which are configured to intervene consecutively and that exhibit different lengths L. Each elastic ring 13 is particularly interposed between the abutment element 10 and a pin 14, which pin 14 is adapted to be solidly constrained with the automated warehouse 2, preferably with the supporting foot 3.

Figure 4:
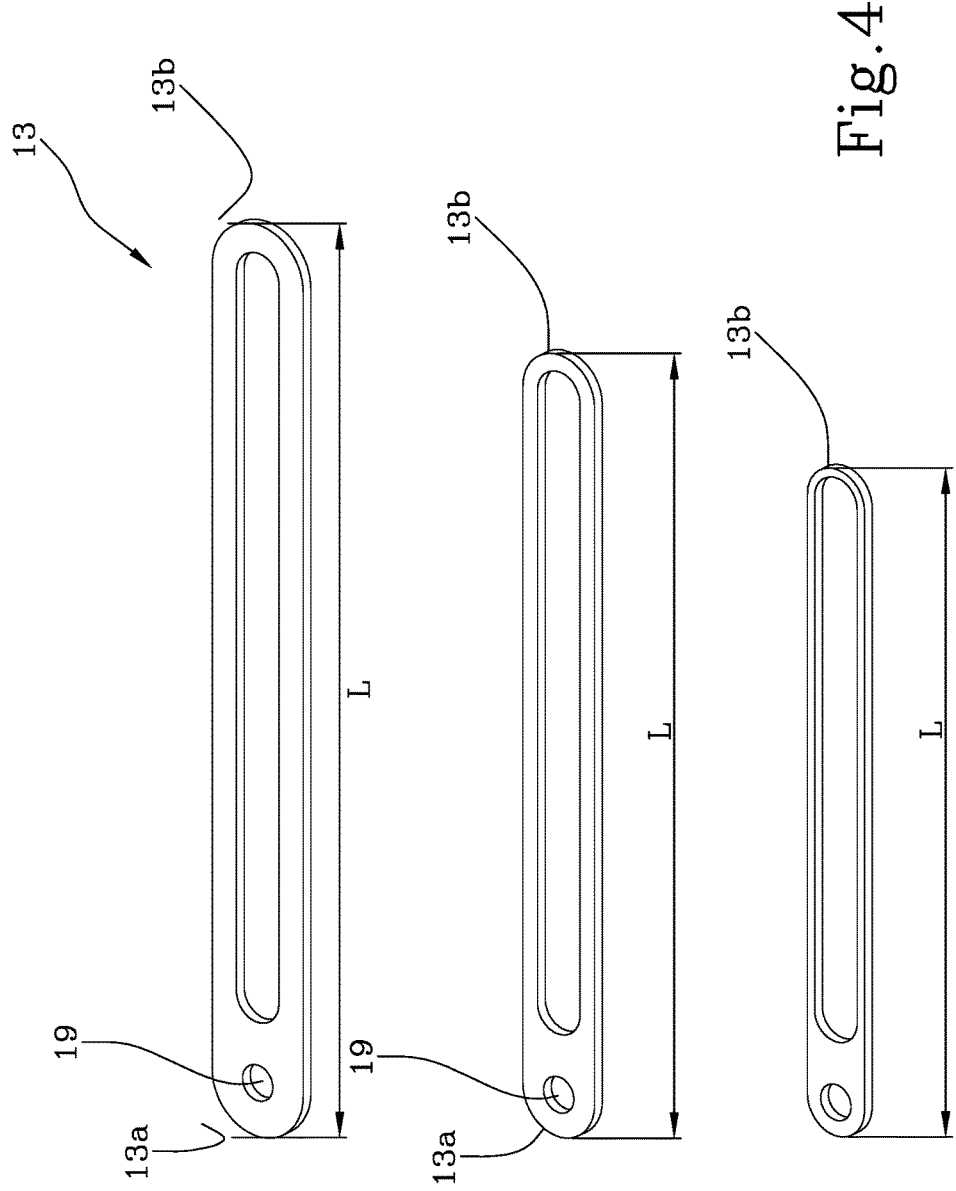
FIG. 4 is a schematic perspective view of some details of the anti-seismic device of FIG. 1.

As illustrated for example in FIG. 4, each elastic ring 13 comprises a first end 13a, being suitable for being solidly constrained with the automated warehouse 2, preferably with the supporting foot 3, and a second end 13b, opposite the first end, suitable to interact with the abutment element 10.

In accordance with a possible embodiment, an arm 15 is adapted to be solidly constrained (at one of its ends), with the automated warehouse 2, preferably with the supporting foot 3. This arm 15 has a groove 16 adapted to slidingly engage with the abutment element 10. Preferably, the groove 16 is open at an opposite end thereof with respect to the supporting foot 3.

Where there is provided the arm 15, the elastic rings 13 are preferably housed within the arm. In particular, each elastic ring 13 is housed inside a respective housing 17.

Figure 2:
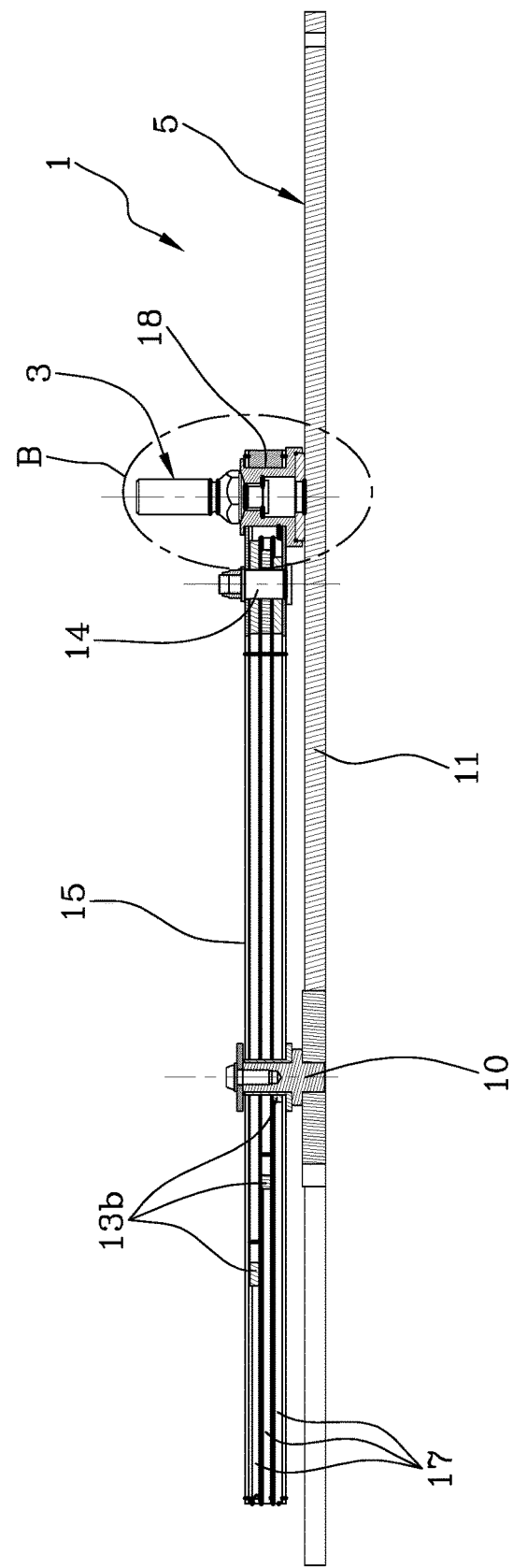
FIG. 2 is a schematic view in section of the anti-seismic device of FIG. 1.
Figure 3:
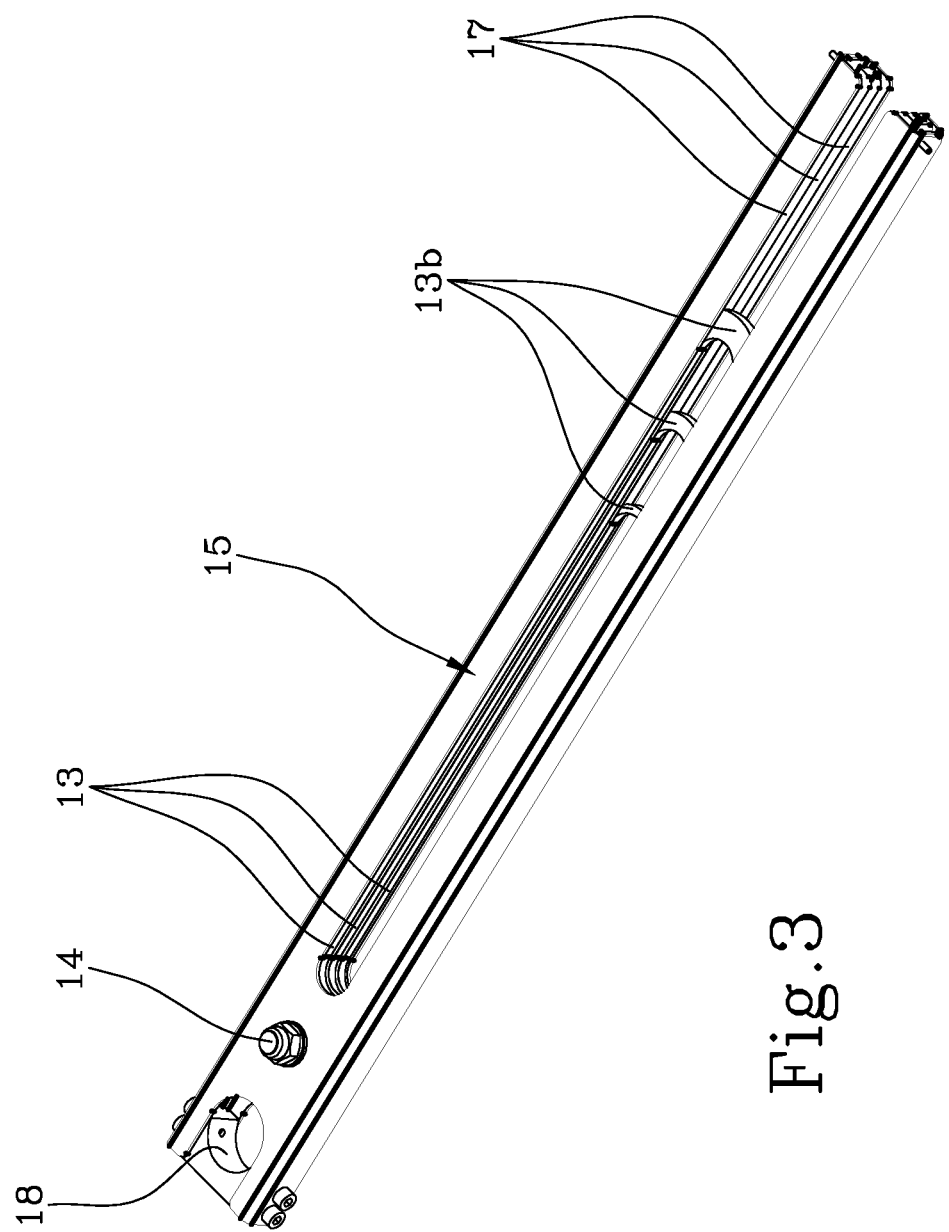
FIG. 3 is a schematic perspective view of a detail of the anti-seismic device of FIG. 1.

Referring to FIG. 2, the arm 15 exhibits one end which is solidly constrained with the supporting foot 3 through a seat 18, which is suitable to be coupled with the base 8 of the supporting foot 3. The pin 14 is disposed transversely in the arm 15 and is inserted internally of holes 19 of the elastic rings 13, at the first end 13a. The spring device 12 particularly comprises three elastic rings 13 with increasing lengths L. Each elastic ring is wrapped around the abutment element 10 and its second end 13b is free. The second ends 13b of the three elastic rings 13 are disposed at increasing distance from the abutment element 10.

Figure 5:
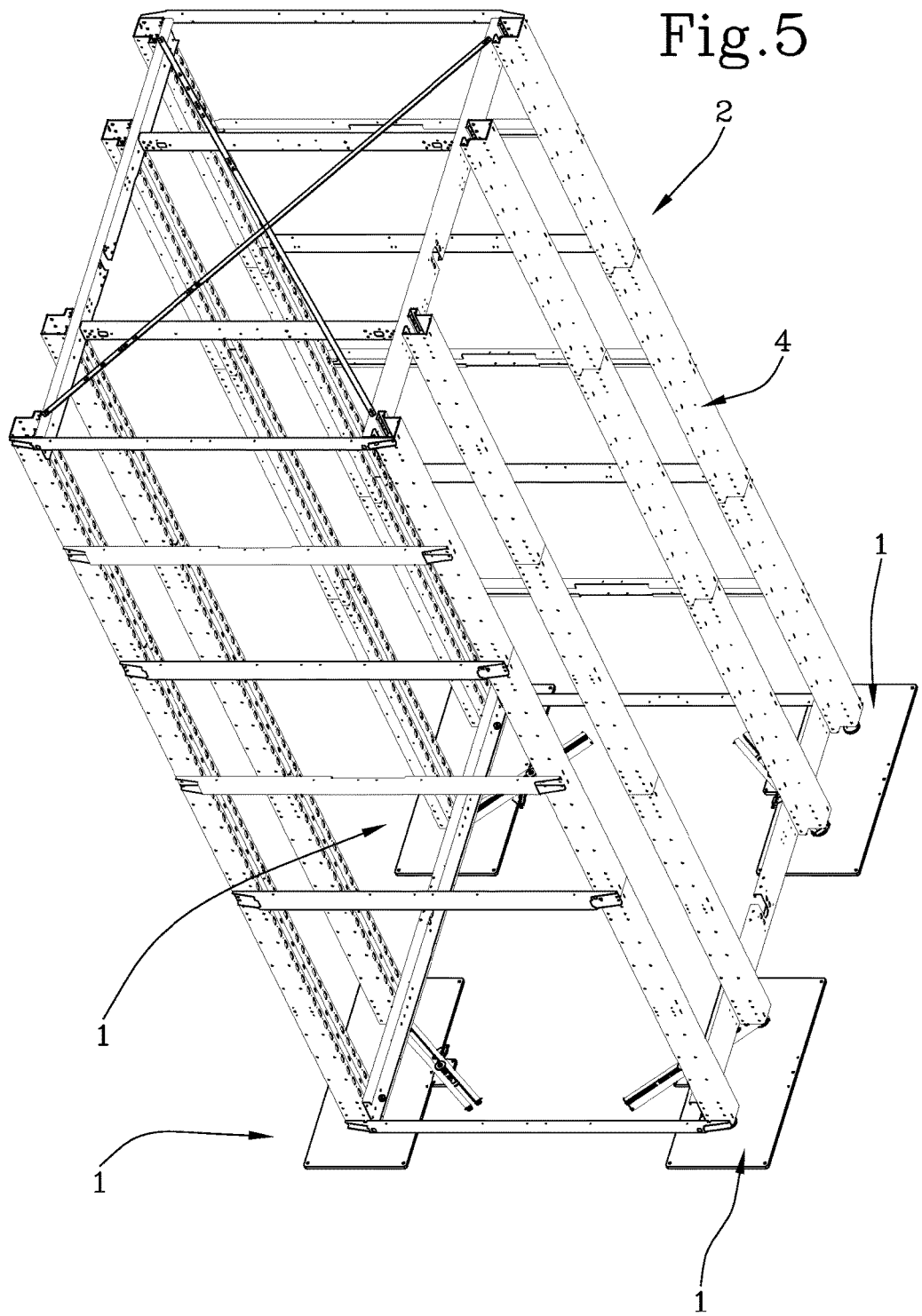
FIG. 5 is a schematic view in perspective of a load-bearing structure, in particular an automated warehouse according to one possible embodiment of the present invention.
Figure 6:
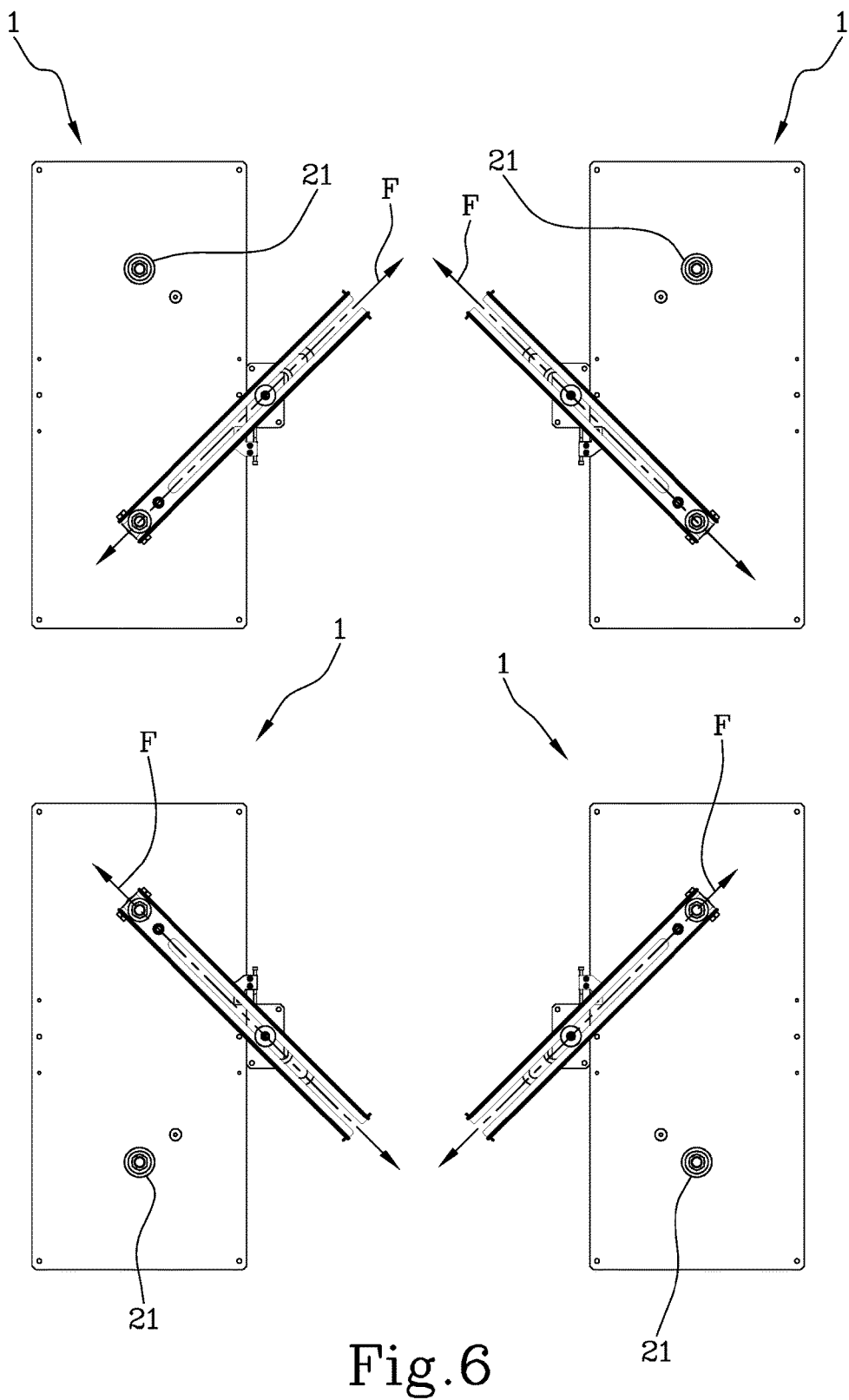
FIG. 6 is a schematic plan view of a detail of the automated warehouse of FIG. 5.

With reference to FIGS. 5 and 6, it is illustrated the warehouse 2, in particular an automated drawer-type warehouse, comprising at least one pair of anti-seismic devices 1 arranged opposite one to another. In particular FIG. 6 illustrates a detail of the warehouse 2, of which only the supporting portion, comprising two pairs of anti-seismic devices, is represented.

Each spring device 12 of each pair exhibits a main direction of operation F. In the case of two pairs of anti-seismic devices, the main directions of operation F of each spring device 12 are arranged in a quadrilateral. Preferably there are provided additional supporting foot 21, sliding on the support and sliding surface 5.

In use, the automated warehouse 2 is resting on supporting feet 3 (preferably four supporting feet), and preferably on further supporting feet 21 (preferably four additional supporting feet provided with a sliding shoe). In case of an earthquake, the supporting foot allows uncoupling of the movement of the ground from that of the automated warehouse. The supporting foot 3 and the sliding plate 11 are further so realized as to define a dissipation system of the kinetic energy still transmitted to the automated warehouse 2 owing to the friction that is generated during the relative sliding due to the sliding shoe 6. To this end, the supporting foot 3 is designed in such a manner as to withstand the high temperatures produced.

In other words there are provided means of energy dissipation which in the case of FIG. 1-6, comprises the sliding shoe 6 associated to the supporting foot 3.

The spring device 12 is configured to bring back the automated warehouse in its initial position.

Each spring device 12 provided with at least two elastic rings 13, is of the "traction" type, and is advantageously configured to exert a return force in one direction when the supporting foot moves away from the abutment element. Thus, owing to the presence of two or more anti-seismic devices provided with spring device 12 of the "traction" type, it is possible to obtain a return oscillating movement to the initial position. The elastic characteristic of the spring device allows to limit the acceleration to which the automated warehouse is subject, particularly during the return step in its initial position, and to make such accelerations independent of the mass of the warehouse itself, so that accidental overturning or falling of the drawers are prevented.

In the case of the embodiment illustrated in the figures, the stiffness of the spring device 12 increases upon increasing of the distance between the supporting foot and the abutment element due to progressive interaction between the abutment element and the elastic rings. For small displacements (then limited masses), an elastic ring only intervenes. For intermediate displacements (then intermediate masses), two elastic rings are involved, and for big displacements (i.e. full load of the warehouse), all three elastic rings are involved.

Owing to the set of two or more elastic overlapping rings which can be sequentially actuated, the anti-seismic device may be maintained compact, and thus the automated warehouse, particularly the height thereof.

Further, use of elastic rings made of elastomeric material, allows the energy to be dissipated the into heat. Thus, as shown in FIG. 1-5, the energy dissipation means, besides the combination constituted by supporting foot 3 and support and sliding surface 5, further comprises the spring device which exhibits at least two elastomeric material rings having different lengths L and configured to intervene consecutively.

According to a possible alternative embodiment, the spring device 12 may comprise at least a progressive helical spring preferably arranged between the abutment element 10 and the supporting foot 3.

Figure 7:
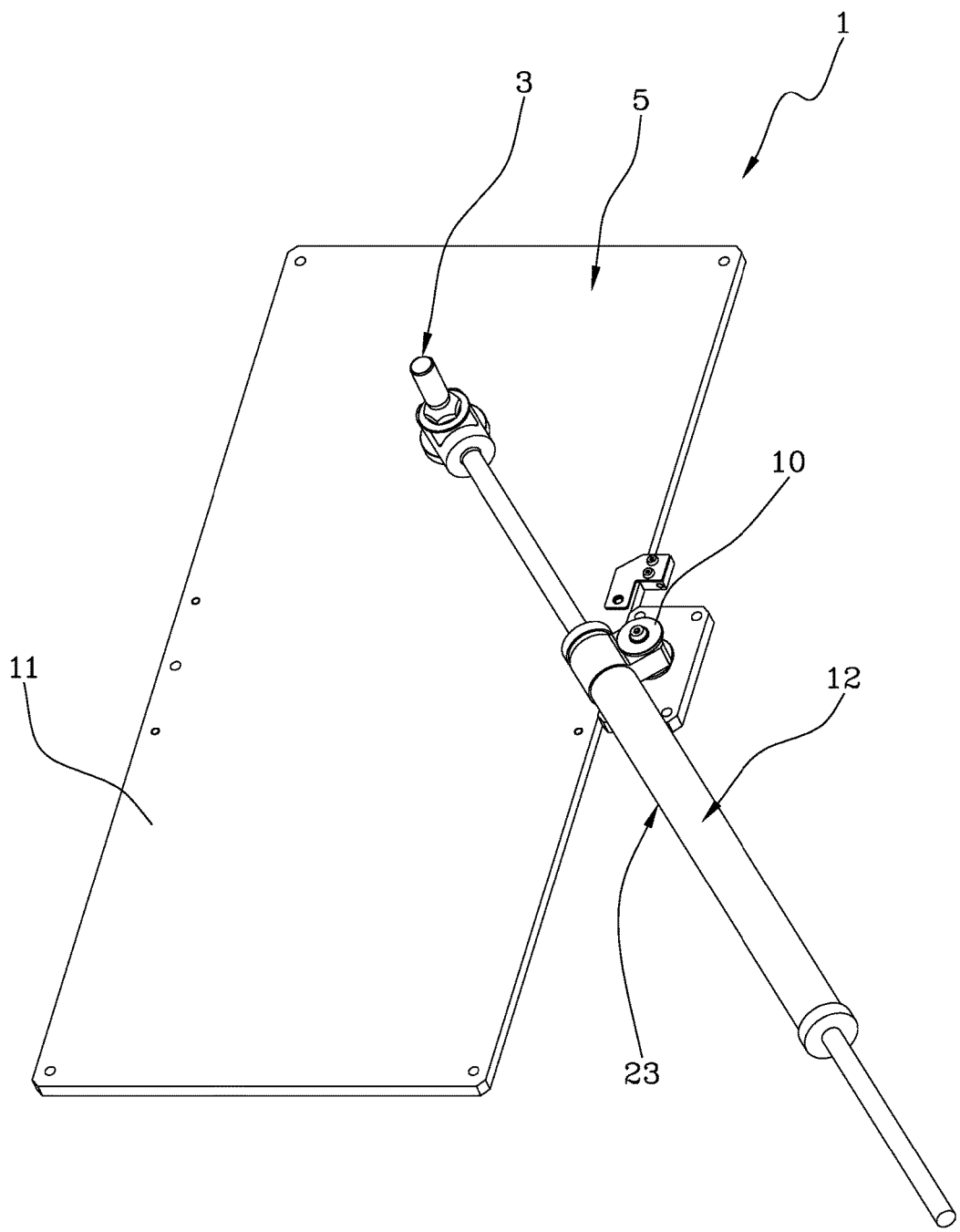
FIG. 7 is a perspective schematic view of an anti-seismic device according to a possible different embodiment of the present invention.
Figure 8:
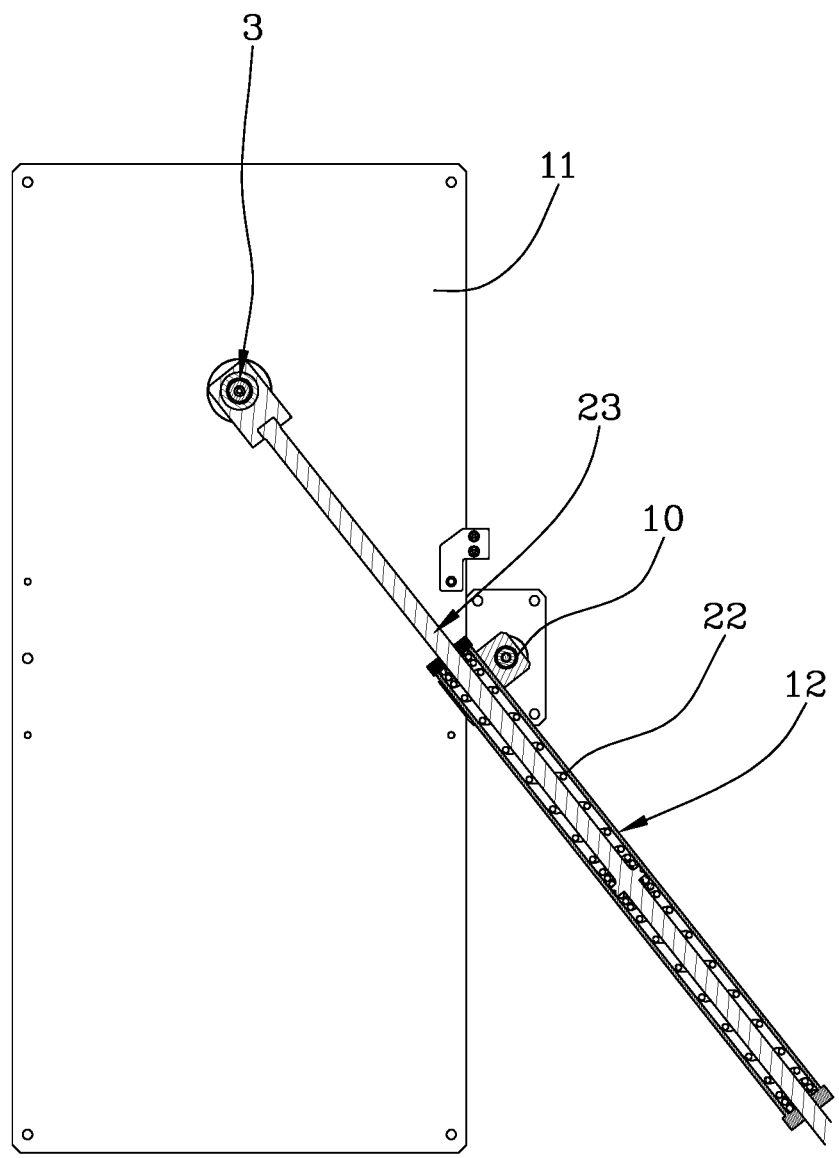
FIG. 8 is a schematic view in section of the anti-seismic device of FIG. 7.
Figure 9:
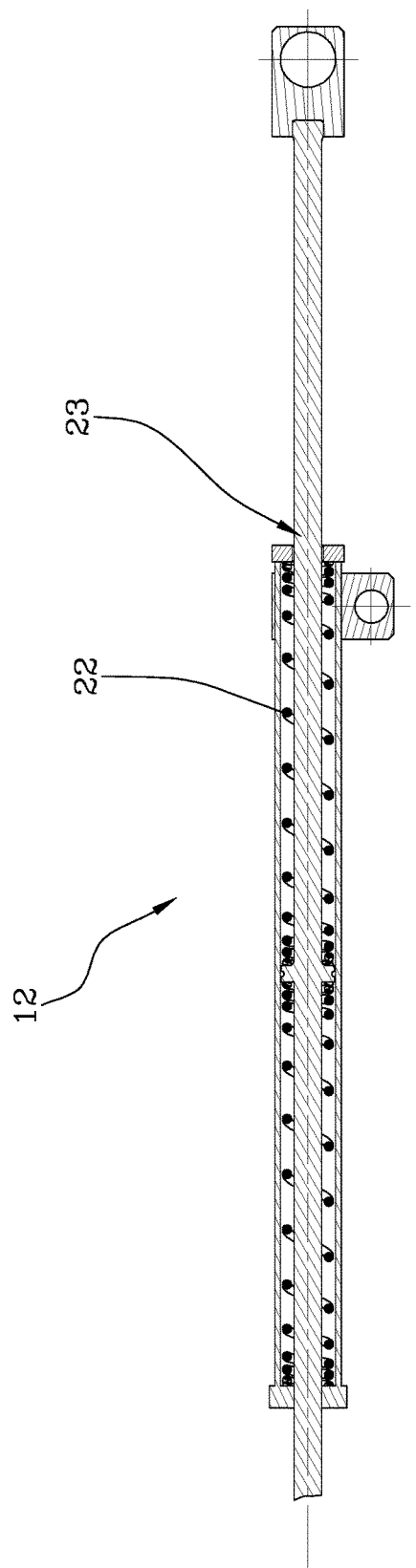
FIG. 9 is a schematic view in section of a detail of the anti-seismic device of FIG. 7.

The progressive helical spring may be a cylindrical helical spring with variable pitch 22 as shown in FIG. 7-9, or a conical helical spring (not shown).

In the case of FIG. 7-9, the spring device 12 comprises a piston-cylinder assembly 23, which is adapted to be interposed between the load-bearing structure, preferably between the supporting foot 3 and the abutment element 10. The progressive coil spring 22 is operationally arranged within the piston-cylinder assembly 23.

Figure 10:
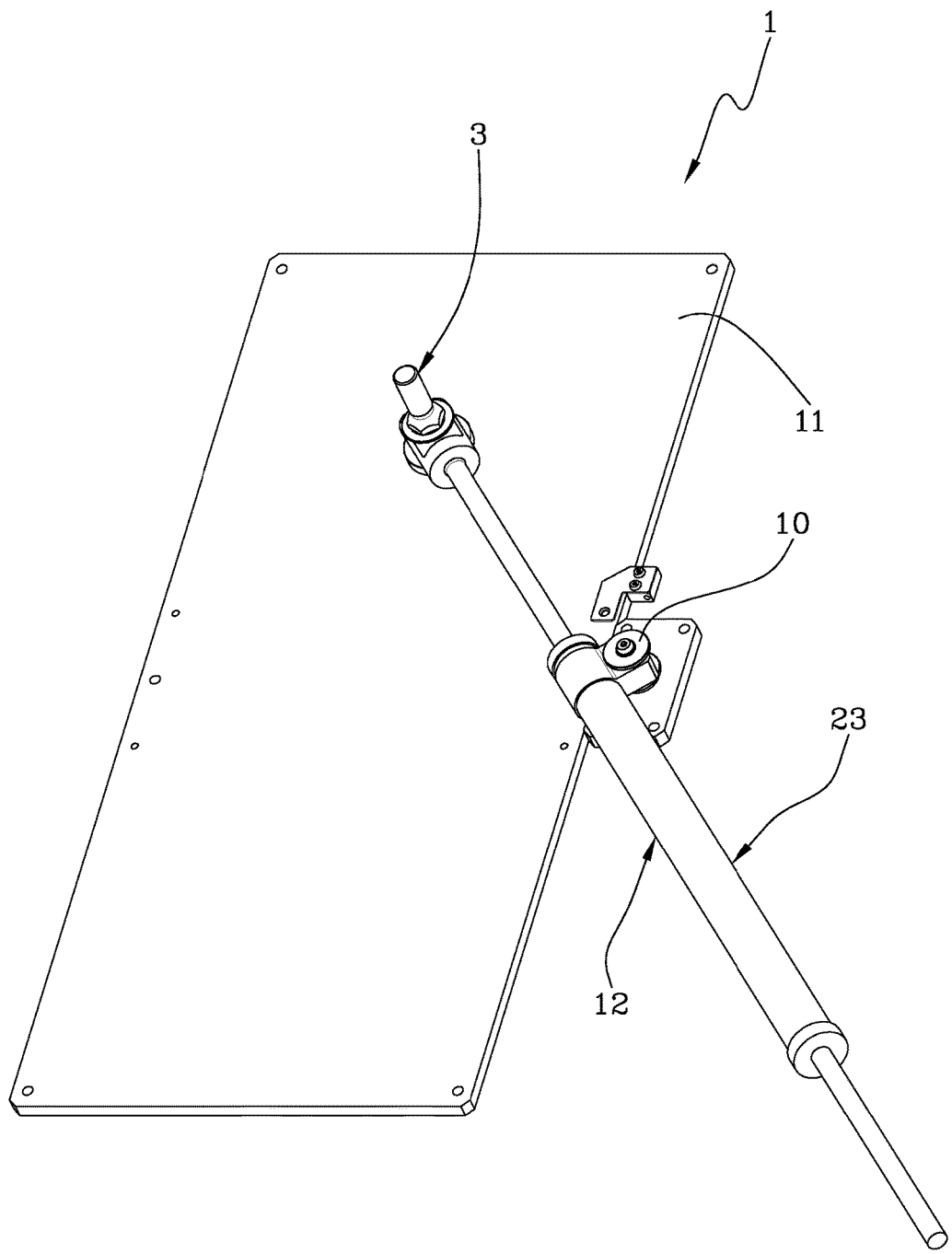
FIG. 10 is a perspective schematic view of an anti-seismic device according to a possible different embodiment of the present invention.
Figure 11:
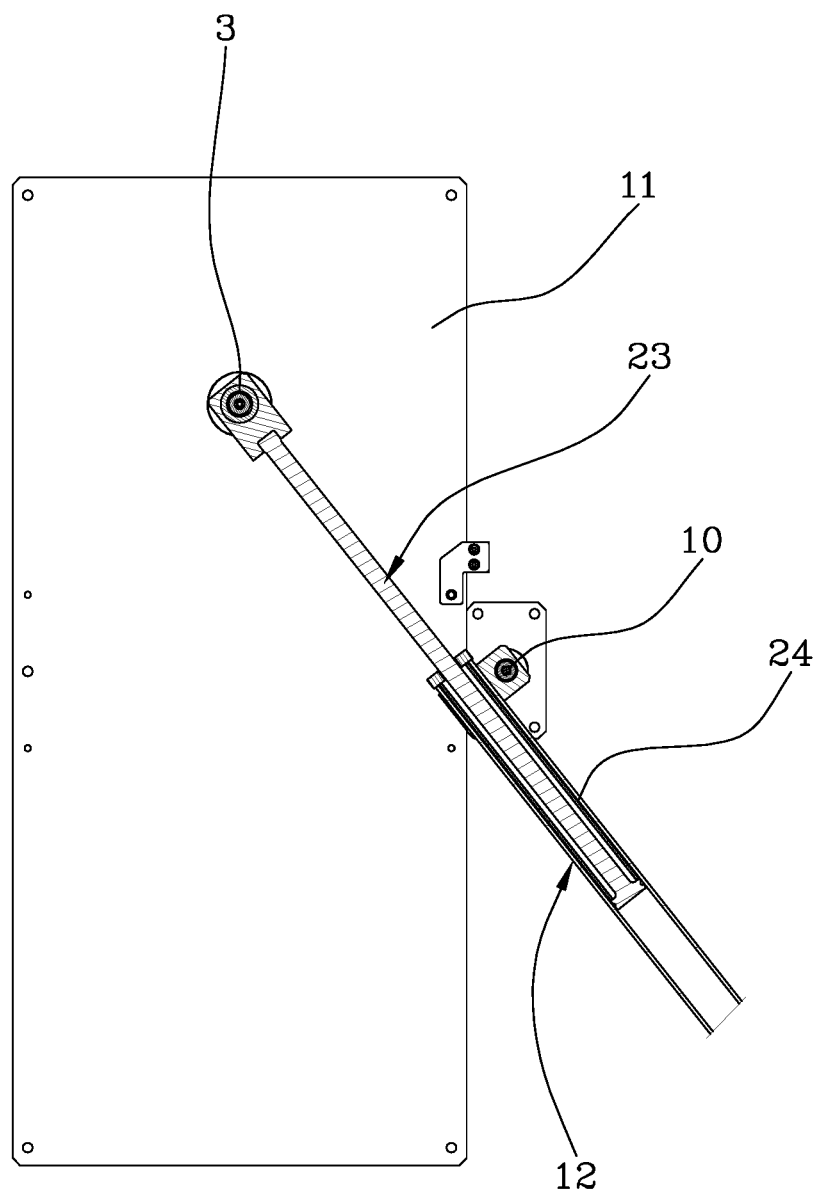
FIG. 11 is a schematic view in section of the anti-seismic device of FIG. 10.
Figure 12:
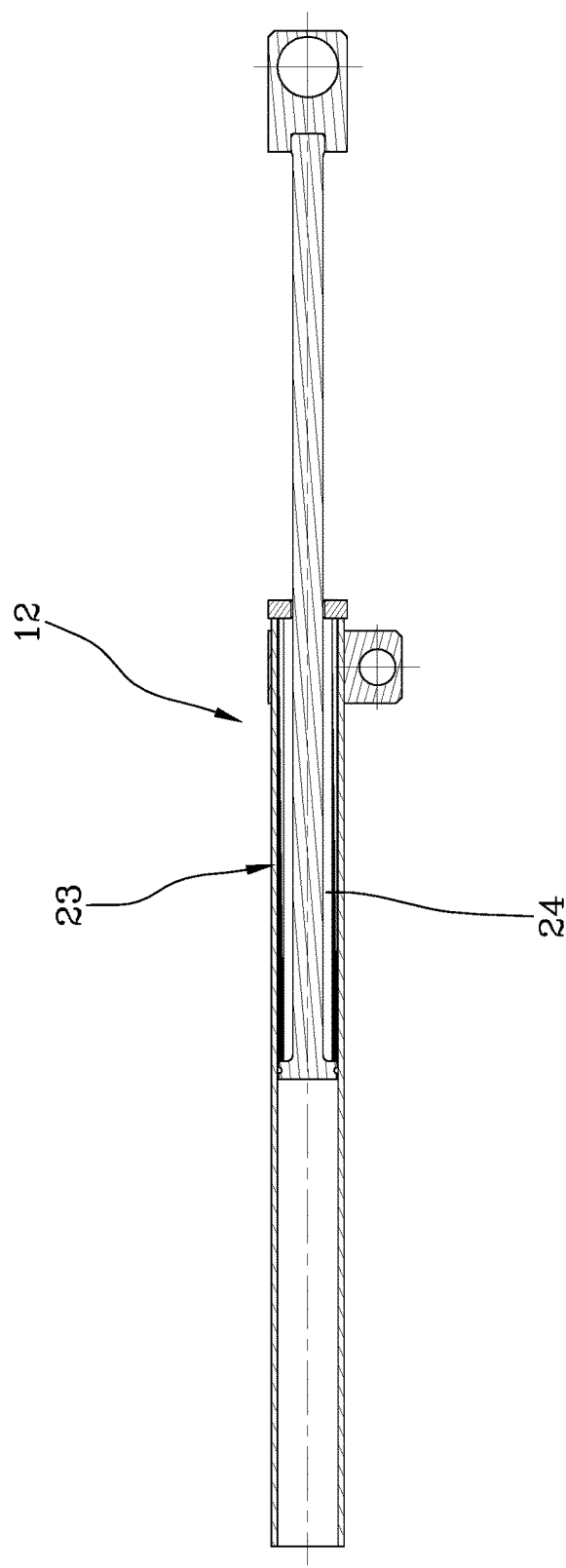
FIG. 12 is a schematic view in section of a detail of the anti-seismic device of FIG. 10.

According to a possible alternative embodiment, the spring device 12 may comprise at least one cylindrical elastomeric spring 24, for example made of cellular polyurethane as shown in FIGS. 10-12. An example of a suitable material for this purpose is the Cellular VULKOLAN®, produced by Bayer.

In the case of FIG. 10-12, the spring device 12 comprises a piston-cylinder assembly 23 adapted to be interposed between the load-bearing structure, preferably between the supporting foot 3, and the abutment element 10. The cylindrical elastomeric spring 24 is operationally arranged within the piston-cylinder assembly 23.

In the case of FIG. 10-12, the energy dissipation means includes a spring device 12 comprising the cylindrical elastomeric spring 24, for example made of cellular polyurethane.

The energy dissipation means may further comprise a sliding shoe 6, as shown by way of example in FIG. 1-6 or 18.

Figure 13:
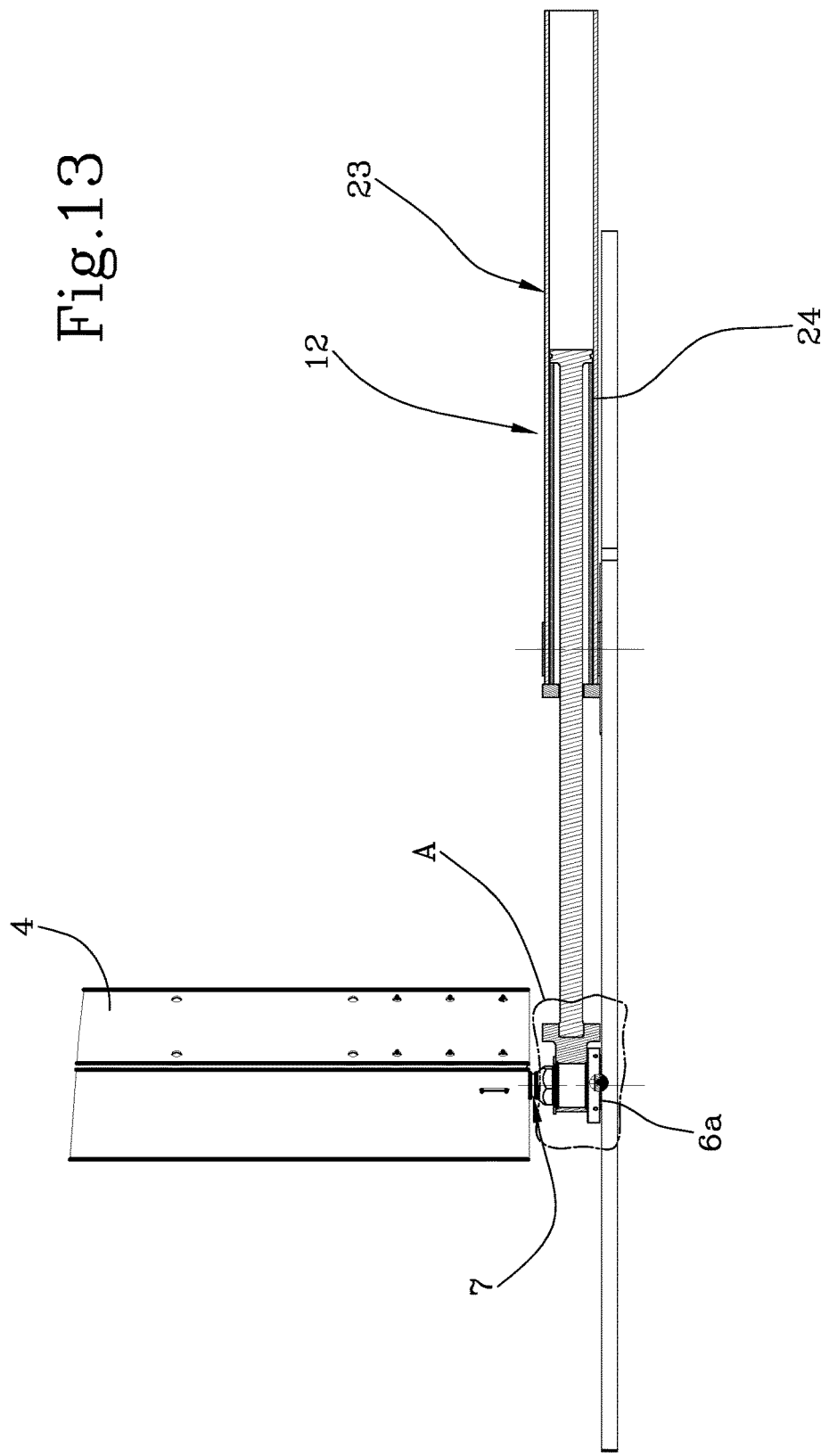
FIG. 13 is a schematic view in section of the anti-seismic device of FIG. 10 according to a possible embodiment.
Figure 14:
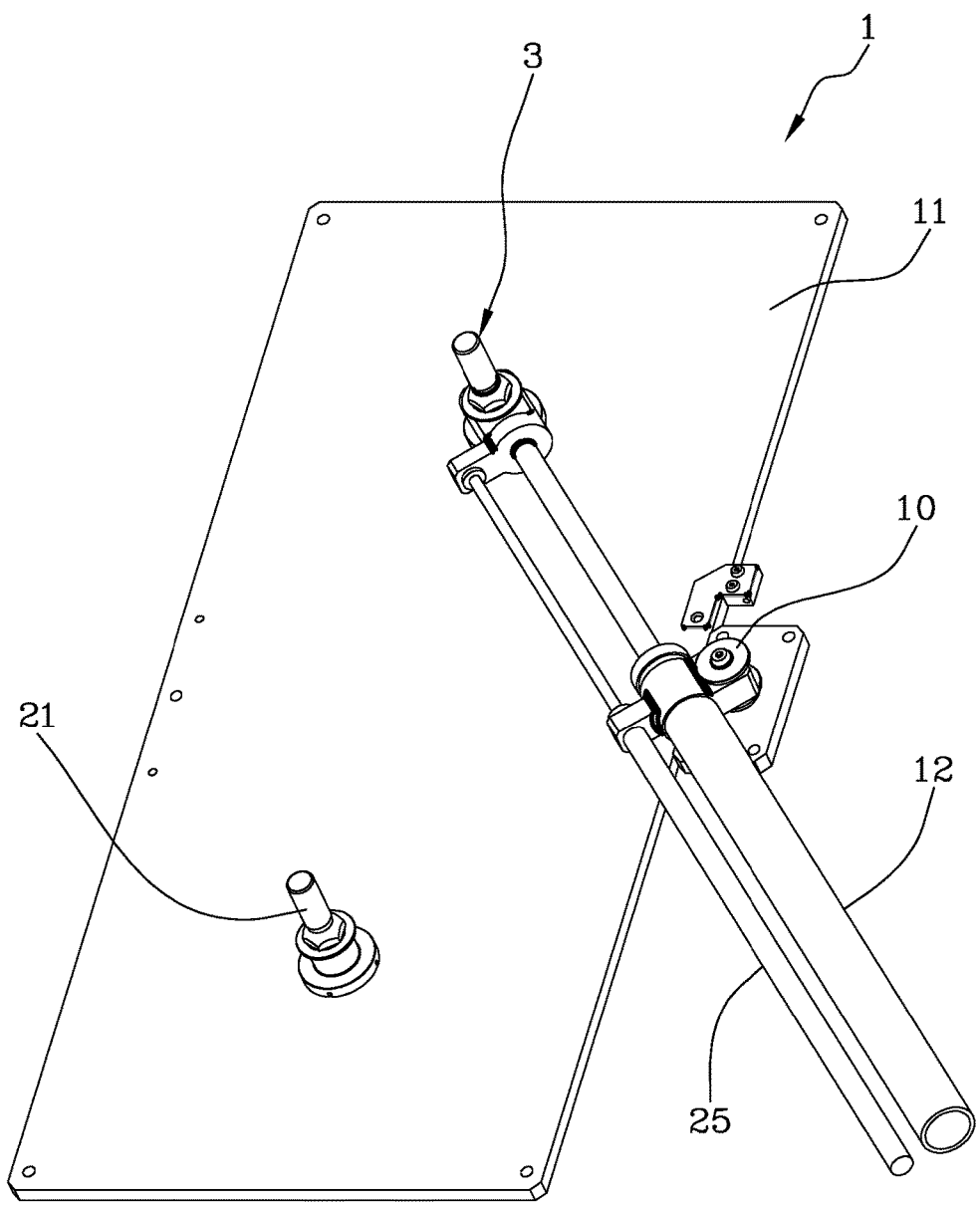
FIG. 14 is a perspective schematic view of an anti-seismic device according to a possible different embodiment of the present invention.
Figure 15:
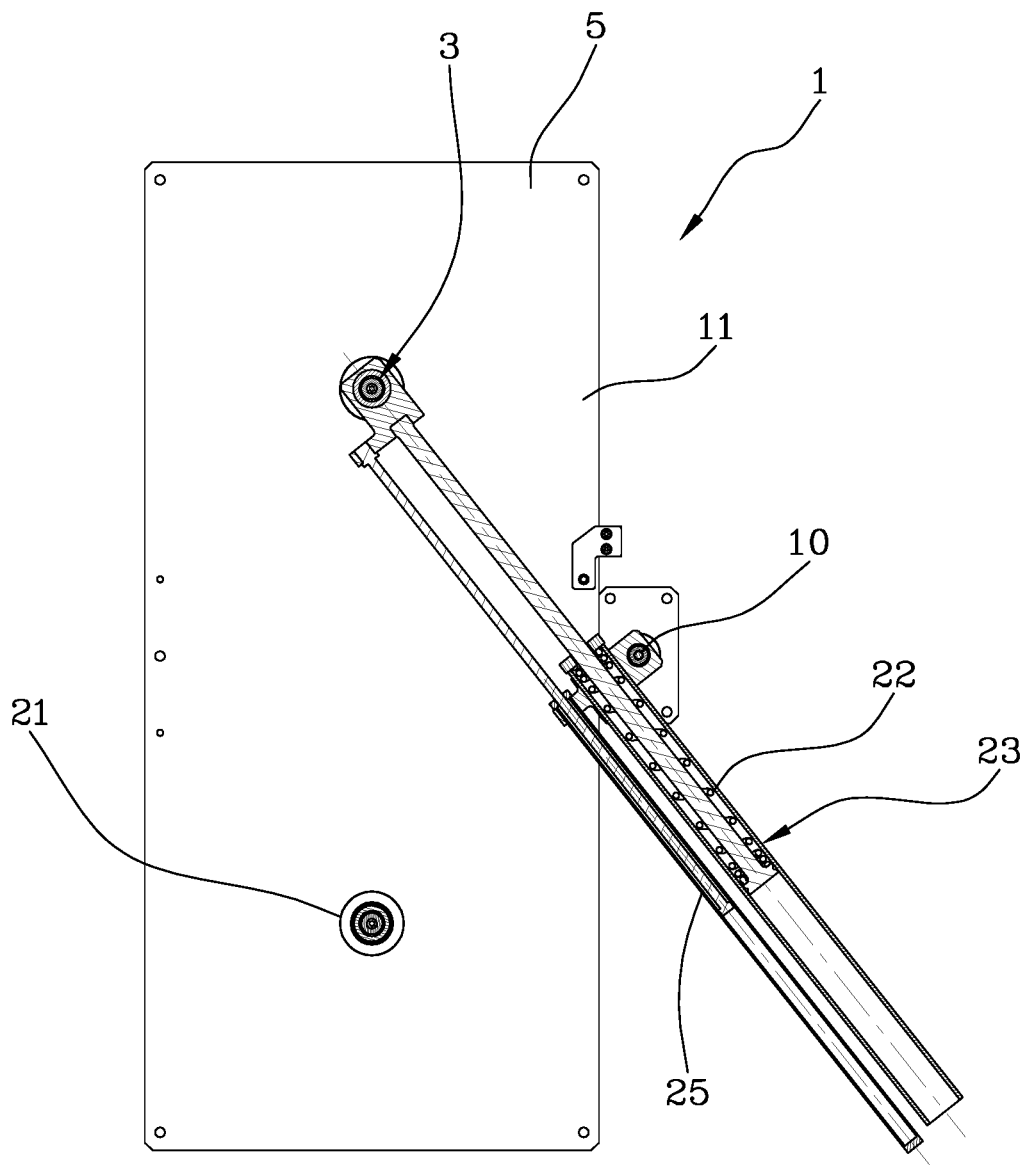
FIG. 15 and FIG. 16 are schematic views in section of the anti-seismic device of FIG. 14, according to different angles.
Figure 16:
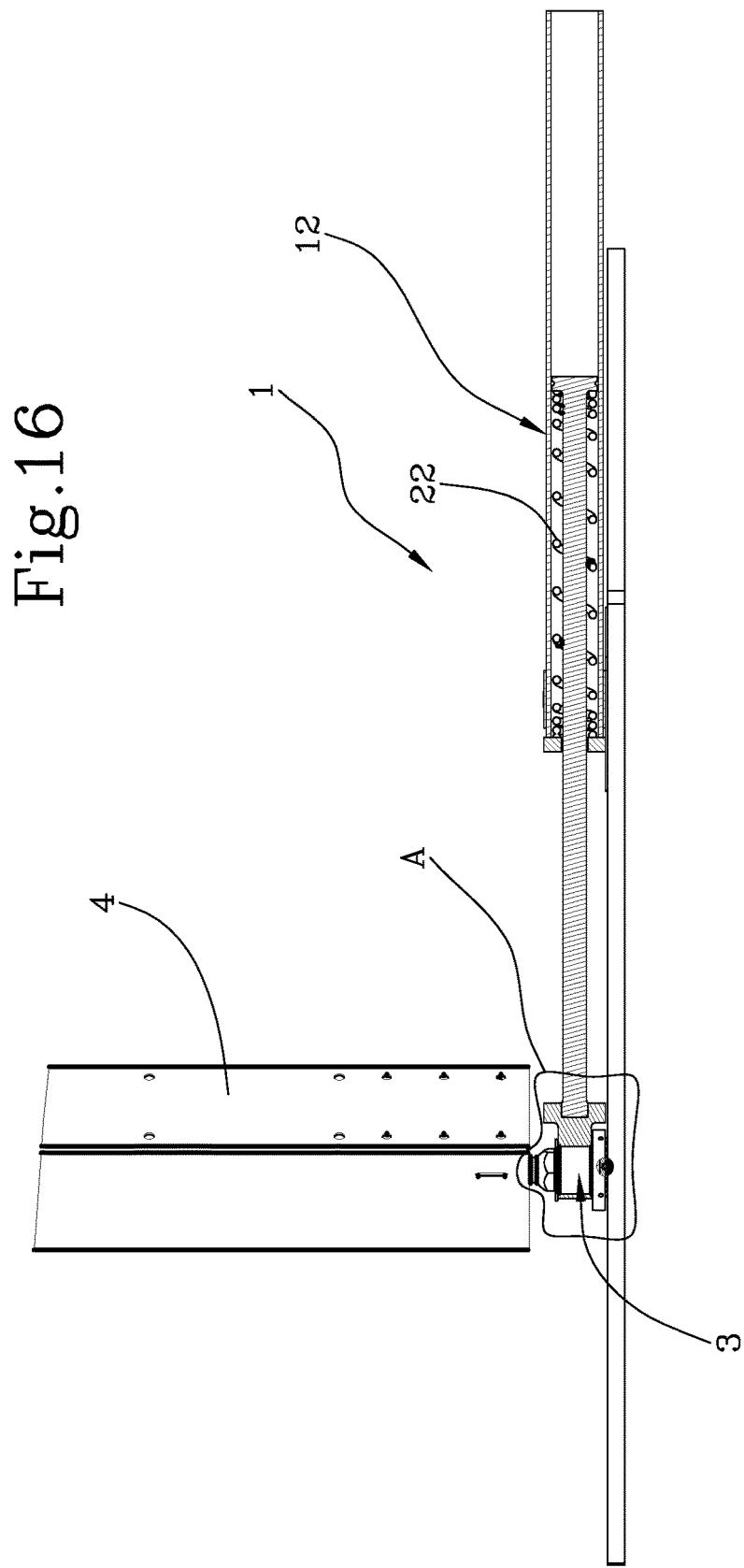
Figure 17:
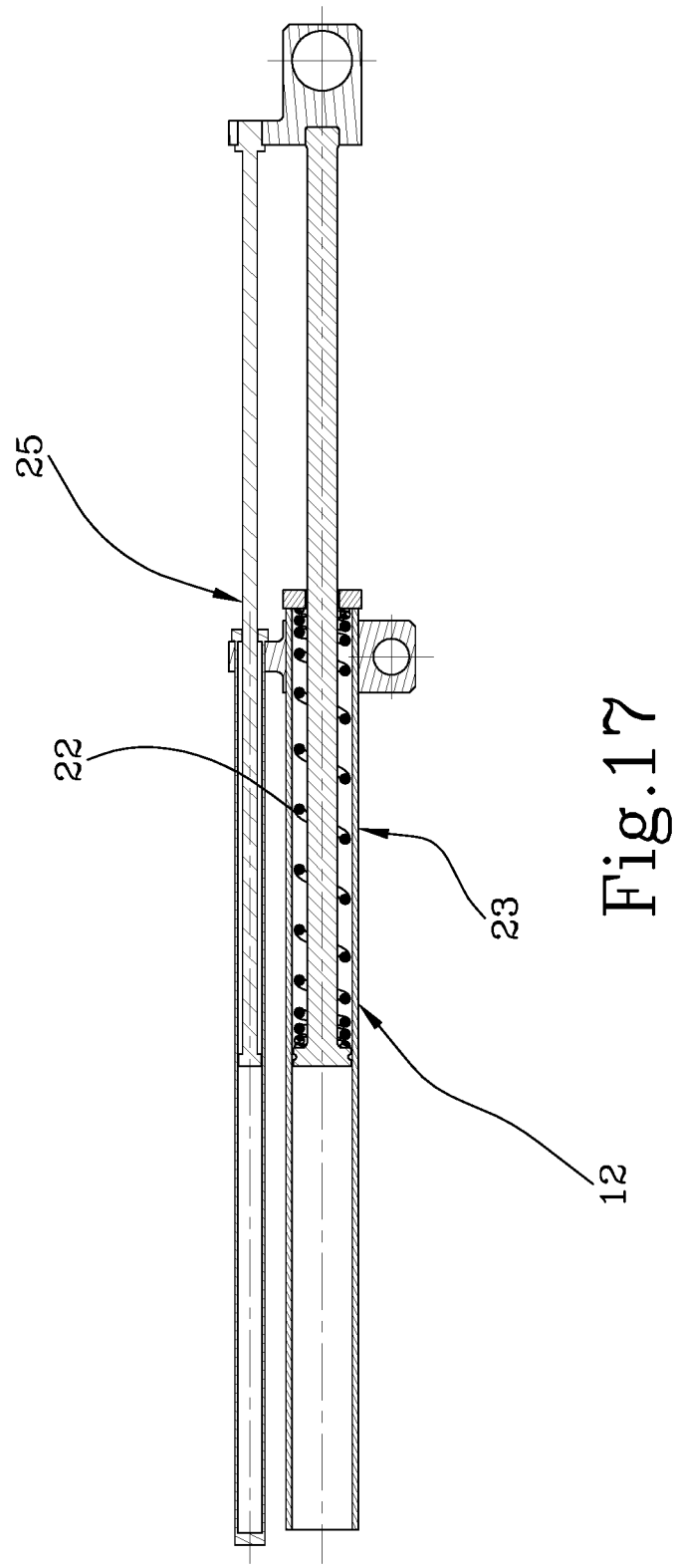
FIG. 17 is a schematic view in section of a detail of the anti-seismic device of FIG. 14.

Alternatively, where it is requested to concentrate energy dissipation in the spring device 12, the supporting foot 3 may be realized according to FIGS. 13,19 and 20 and comprise a rolling shoe 6a.

In accordance with a possible embodiment, shown by way of example in FIGS. 14-17, the anti-seismic device may comprise energy dissipation means comprising a shock absorber 25 disposed in parallel to the spring device 12. As illustrated for example in FIGS. 14-17, the remaining components of the anti-seismic device 1, may be similar to those described with reference to FIGS. 7-9.

Alternatively, the shock absorber 25 can be added to any type of anti-seismic device in order to increase or add an effect of energy dissipation. FIGS. 14-17 illustrate a supporting foot 3 provided with a rolling shoe 6a (similar to that shown in FIGS. 19-20). Alternatively there may be provided to use a supporting foot 3 supplied with a sliding shoe 6 (similar to that shown in FIG. 18).

In other words, any embodiment of the anti-seismic device according to the present invention may comprise one or more supporting feet 3 selected from among a supporting foot 3 provided with a rolling shoe 6a (similar to that shown in FIGS. 19-20), and a supporting foot 3 provided with a sliding shoe 6 (similar to that shown in FIG. 18).

In an alternative embodiment not illustrated, the spring device 12 may be operating along one or more directions. For example, the spring device may comprise a disc-shaped elastomeric element associated with the supporting foot 3. In particular, the supporting foot 3 is arranged within the projection on the supporting plane of the disc-shaped element. For example, the supporting foot is passing through the disc-shaped element.

The disc-shaped element is solidly constrained to an anchoring element. In particular, the anchoring element can be annular-shaped and constrained to the outer edge of the disc-shaped element.

The present invention attains the set aims by decoupling the movement of the load-bearing structure (automated warehouse) from that of the ground, and preferably by dissipating the kinetic energy. The set aims are furthermore achieved by the present invention owing to a spring device with non-linear elastic characteristic, which elastic characteristic gives rise to an oscillating movement in order that the automated warehouse may be brought back in the central position thereof. The oscillating movement, irrespective of the mass of the load-bearing structure of the warehouse, makes the load-bearing structure subject to limited maximum accelerations, which are lower than those that would cause overturning of the warehouse or which would overcome the friction coefficient of the drawers in the case of warehouses.

The invention claimed is:

1. An anti-seismic device (1) for automated warehouses (2) and other load-bearing structures and machines, the anti-seismic device (1) comprising:
    at least one supporting foot (3) suitable for being fixed to a load-bearing structure (4) of said automated warehouse (2), the supporting foot (3) having a lower surface in contact with and slidable upon a support and sliding surface (5), said supporting foot (3) being configured for resting in contact with and sliding on the support and sliding surface (5), so as to allow relative movement of the automated warehouse (2) with respect to the support and sliding surface (5),
    at least one abutment element (10) suitable for being solidly constrained with said support and sliding surface (5), and
    at least one spring device (12) adapted to be interposed between said abutment element (10) and said automated warehouse (2), said spring device (12) being configured to generate a return action of force and/or torque of the automated warehouse (2) as a result of the relative movement of said automated warehouse (2) with respect to the support and sliding surface (5), said spring device (12) having an elastic characteristic of a non-linear type, wherein the spring device (12) allows sliding movement of the supporting foot (3) on the support and sliding surface (5) in a first direction parallel to a longitudinal or major axis of the spring device (12) and in a second direction transverse to the first direction.

2. An anti-seismic device according to claim 1 wherein said spring device (12) has a progressive elastic characteristic.

3. An anti-seismic device according to claim 1 wherein said spring device (12) is configured to generate a return movement of the automated warehouse having maximum acceleration which is independent of the value of the mass associated with the automated warehouse itself.

4. An anti-seismic device according to claim 1 wherein said spring device (12) comprises at least one pre-loaded elastic element (13,22,24) to promote the recovery action of the automated warehouse (2) initial position relative to the support and sliding surface (5).

5. An anti-seismic device according to claim 1 comprising a sliding plate (11) suitable for being solidly constrained with a supporting surface of the automated warehouse (2) and defining said support and sliding surface (5) for said supporting foot (3).

6. An anti-seismic device according to claim 5 wherein said abutment element (10) is solidly constrained with said sliding plate (11) and protrudes transversely from said support and sliding surface (5).

7. An anti-seismic device according to claim 1 wherein said spring device (12) is operatively interposed between said supporting foot (3) and said abutment element (10).

8. An anti-seismic device according to claim 1 wherein said spring device (12) operates along a direction in one direction only or in opposite directions.

9. A device according to claim 8 wherein said spring device (12), if working in opposite directions, develops its own action when a change of the length thereof occurs owing to the effect produced by the automated warehouse (2) movement with respect to the ground, and said action is such as to tend to recover the resting length of the spring device (12) both in case of elongation or shortening of the spring device.

10. A device according to claim 8 wherein said spring device (12), if working in one direction of traction only, develops its own action solely if the length thereof increases with respect to the resting length, whereas if working in one direction of compression only, said spring device develops its own action only if a reduction of its length with respect to the resting length occurs.

11. An anti-seismic device according to claim 1 wherein said spring device (12) comprises at least two elastic rings (13) having different lengths (L) and configured to intervene consecutively, each elastic ring (13) being interposed between said abutment element (10) and a pin (14) suitable for being solidly constrained to said automated warehouse (2).

12. An anti-seismic device according to claim 11 wherein each elastic ring (13) comprises a first end (13a) suitable for being solidly constrained to said automated warehouse (2), and a second end (13b), opposite the first end (13a), suitable for interacting with said abutment element (10).

13. An anti-seismic device according to claim 11 comprising an arm (15) suitable for being solidly constrained to said automated warehouse, and having a groove (16) adapted to slidably engage with said abutment element (10).

14. An anti-seismic device according to claim 13 wherein said elastic rings (13) are arranged within said arm (15).

15. An anti-seismic device according to claim 1 wherein said spring device comprises at least one progressive helical spring.

16. An anti-seismic device according to claim 15 wherein said spring device comprises a piston-cylinder assembly (23) suitable for being interposed between said load-bearing structure and said abutment element (10), and wherein said progressive helical spring is operationally arranged inside said piston-cylinder assembly (23).

17. An anti-seismic device according to claim 1 wherein said spring device comprises at least one cylindrical elastomeric spring (24).

18. An anti-seismic device according to claim 17 wherein said spring device comprises a piston-cylinder assembly (23) suitable for being interposed between said load-bearing structure and said abutment element (10), and wherein said cylindrical elastomeric spring (24) is operationally arranged inside said piston-cylinder assembly (23).

19. An anti-seismic device according to claim 1, comprising means of energy dissipation.

20. An anti-seismic device according to claim 19 wherein the energy dissipation means comprises one or more among:
   a shock absorber (25) arranged in parallel with said spring device (12);
   a sliding shoe (6) associated with or as part of said supporting foot (3);
   said spring device (12) comprising at least two rings of elastomeric material (13) having different lengths (L) and configured to intervene consecutively; and
   said spring device (12) comprising a cylindrical elastomeric spring (24).

21. An anti-seismic device according to claim 1 wherein said supporting foot (3) defines an element of energy dissipation and includes a sliding shoe (6).

22. An anti-seismic device according to claim 1 wherein said supporting foot (3) comprises a rolling shoe (6a).

23. An anti-seismic device according to claim 1 wherein said spring device (12) operates along one or more directions.

24. A load-bearing structure provided with drawers, the load-bearing structure comprising at least one anti-seismic device (1) according to claim 1.

25. A load-bearing structure according to claim 24 comprising at least one second supporting foot (21) sliding on said support and sliding surface (5), the second supporting foot (21) being different from the supporting foot (3).

* * * * *